United States Patent [19]

Franzen et al.

[11] Patent Number: 5,521,379
[45] Date of Patent: May 28, 1996

[54] METHOD OF SELECTING REACTION PATHS IN ION TRAPS

[75] Inventors: Jochen Franzen, Bremen; Reemt-Holger Gabling, Stuhr, both of Germany

[73] Assignee: Bruker-Franzen Analytik GmbH, Bremen, Germany

[21] Appl. No.: 277,666

[22] Filed: Jul. 20, 1994

[30] Foreign Application Priority Data

Jul. 20, 1993 [DE] Germany .......................... 43 24 233.2

[51] Int. Cl.⁶ .................................................. H01J 49/42
[52] U.S. Cl. ............................................ 250/282; 250/292
[58] Field of Search ....................................... 250/282, 292

[56] References Cited

U.S. PATENT DOCUMENTS

| | | | |
|---|---|---|---|
| 4,540,884 | 9/1985 | Stafford et al. | 250/282 |
| 4,686,367 | 8/1987 | Louris et al. | 250/282 |
| 4,761,545 | 8/1988 | Marshall et al. | 250/291 |
| 4,882,484 | 11/1989 | Franzen et al. | 250/282 |
| 4,975,577 | 12/1990 | Franzen et al. | 250/291 |
| 5,134,286 | 7/1992 | Kelley | 250/282 |
| 5,381,006 | 1/1995 | Wells et al. | 250/282 |

FOREIGN PATENT DOCUMENTS

| | | |
|---|---|---|
| 0292187 | 11/1988 | European Pat. Off. . |
| 0362432 | 4/1990 | European Pat. Off. . |
| 0215615 | 2/1991 | European Pat. Off. . |
| 9216010 | 4/1992 | WIPO . |
| 9305533 | 3/1993 | WIPO . |
| 9312536 | 6/1993 | WIPO . |

OTHER PUBLICATIONS

*A New Mode of Operation For The Three–Dimensional Quadrupole Ion Store (Quistor): The Selective Ion Reactor,* Fulford et al. Int. Jour. of Mass Spectrometry & Ion Physics, 26 (1978) pp. 155–162.

*Gas Chromatography Mass Spectrometry Applications in Micro–biology,* Odham et al., pp. 31–34.

Primary Examiner—Jack I. Berman

[57] ABSTRACT

A method is disclosed for chemical ionization of the molecules of an analysis gas or analysis gas mixture or for studying ion-molecule reactions in ion traps. Specifically, by superposing a quadrupole field with a dipolar introduced frequency mixture in which there are accurately selected frequency gaps in the ionization phase of the analysis, the only ions which are stored are those which are on the selected reaction path of the reactant gas ions for making the proper reactant ions for the desired ion-molecule reaction. All the other ions are eliminated from storage by excitation of their secular oscillations. In a second phase, by switching off the dipolar introduced frequency mixture, all the ions can be stored in a wide range of mass-to-charge ratios, and therefore also the product ions of the desired ion-molecule reactions of the analysis gas. In a third phase the spectrum of the product ions is scanned.

14 Claims, 3 Drawing Sheets

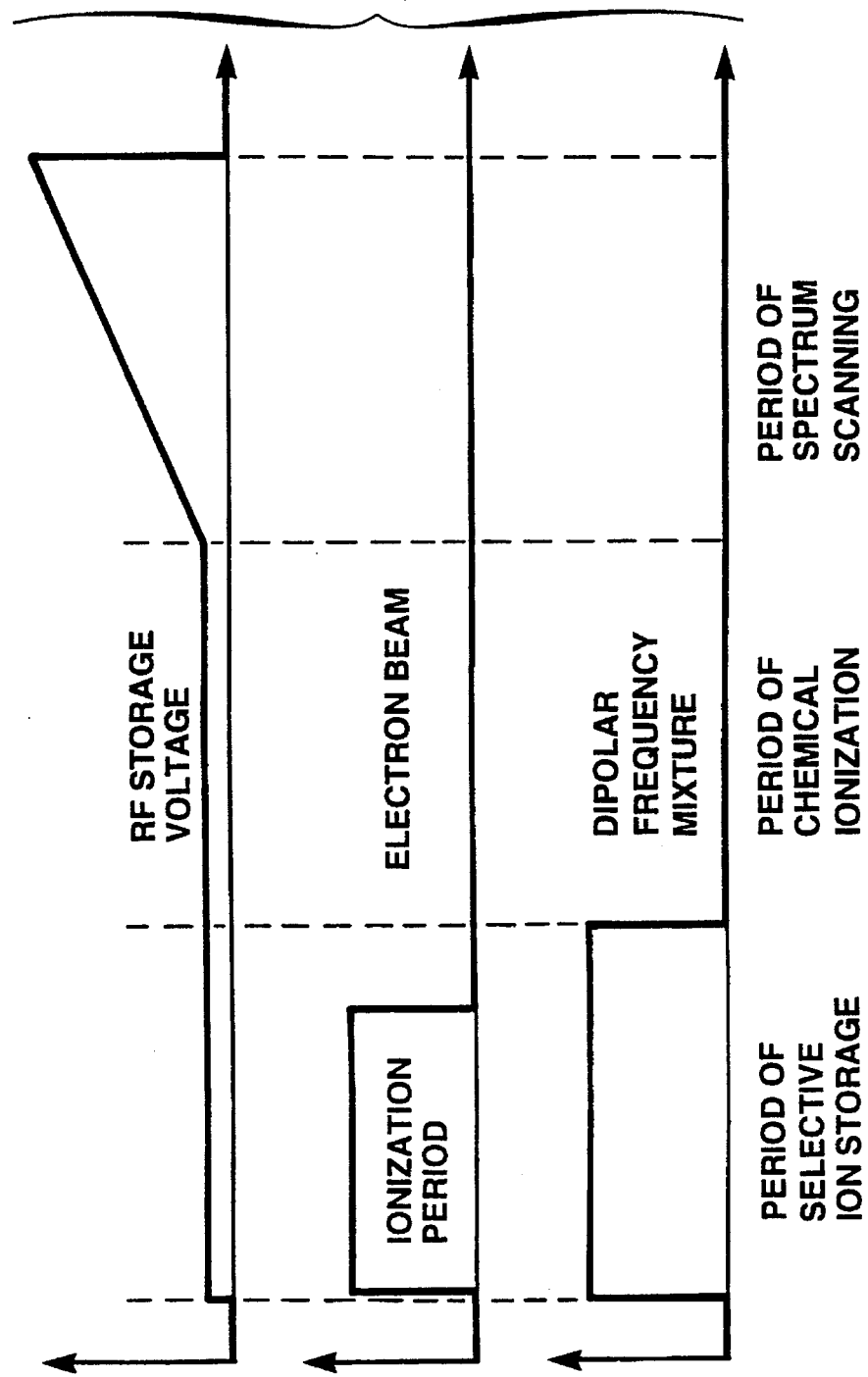

METHOD OF SELECTING REACTION PATHS IN ION TRAPS

FIELD OF THE INVENTION

The invention relates to a method for carrying out ion-molecule reactions in RF quadrupole Ion Traps for chemically ionizing (CI) the molecules of an analyte gas, or for the analysis of gas mixtures, or for studying ion-molecule reactions in ion traps.

BACKGROUND OF THE INVENTION

Chemical ionization is generally a 3-stage process. In the first stage primary ions of the reactant gas are generated by electron impact. In the second stage secondary ions of the reactant gas are generated by ion-molecule reactions of the primary ions with the molecules of the reactant gas. In the third stage the required ions of the analyte gas are created by ion-molecule reactions with the secondary ions of the reactant gas. In this process there are very many side-reactions and branches of the reaction path which lead to undesirable reaction products.

Ion-molecule reactions have been studied for a long time to clarify reaction mechanism. It has been particularly the reaction cross-sections which are of interest, and the dependency of the reactions on gas temperature, concentration of the reaction participants, the impact energies, and other parameters.

Study of the ion-molecule reactions has been performed in ion beams, in plasma, in space-charge-bound ion clouds (locked into an electron beam), but particularly also in both types of ion trap mass spectrometer: ion cyclotron resonance spectrometers (ICR) and RF quadrupole ion traps. The reactions are examined by mass-spectrometric analysis of the resulting product ions.

There is particular interest in ion-molecule reactions as probes for certain structural properties of the neutral molecules examined. For this purpose it is necessary to have output ions of high purity for the reactions in order to prevent contamination of the product ion spectrum examined by undesirable by-products.

Elimination of undesirable ions has been well known for a long time now with regard to ICR spectrometers. One has also been able to isolate or store selectively ions of uniform mass-to-charge ratios in quadrupole ion traps.

For the study and application of ion-molecule reactions, however, it is frequently necessary to select specific output ions for a certain reaction using a reaction path which involves predecessor ions and it is therefore desirable to suppress side-reactions. So far there have been special methods available for this.

Chemical Ionization (CI) is a widespread method for ionizing substances. When used properly it provides information about the molecular weight of a substance. Spectra of mixtures can be interpreted more easily because far fewer fragmented ions are created than with electron impact spectra. Measurement of the molecular ions is also important for clarification of the structure of the substances. Chemical ionization is advantageous particularly for applying MS/MS methods to investigating molecular ions. There are other applications in fast quantitative analyses of substances in mixtures.

As various reactant gases and various ionization reactions are available for chemical ionization, the method can be very well adapted to the aim of the investigation. The method is described in all the relevant, more recent mass spectrometry textbooks, for example, in Odham, Larsson and Mardh's "Gas Chromatography/Mass Spectrometry, Applications in Microbiology", Plenum Press, New York and London, 1984.

Chemical ionization is described as "soft" ionization which ionizes more carefully than the relatively "hard" electron impact ionization. Careful ionization means that during the ionization process there is virtually no fragmentation of the molecular ion because only small further quantities of energy are transferred to the molecule in addition to the ionization energy. The usual electron impact ionization with 70 to 100 eV electrons shows no measurable molecular ions for approx. 30% of all substances but only fragmented ions; unambiguous identification of the substances is thus hindered. Almost with regularity, chemical ionization, on the other hand, shows a "pseudomolecular ion" which has been obtained by protonation and the mass of which is just one atomic mass unit larger than that of the molecular ion. By suitably selecting the reactant gas and the ionizing reaction it is possible to suppress almost completely any ensuing fragmentation of the pseudomolecular ion.

Chemical ionization (CI) usually takes place in three ionization stages from a mixture of gases. The gas mixture consists of a largely inert carrier gas which plays no role in the reactions (also called collision gas), a reactant gas for forming the proper reactant ions for chemical ionization, and the analyte or test gas which is to be ionized chemically. The latter can also be a mixture of various substance gases or vapours if at the same time more than one substance is to be subjected to a qualitative or quantitative investigation.

In standard ion sources for chemical ionization, which are operated at a pressure of about 1 millibar, the reactant gas has a much higher concentration than the analyte gas. Therefore, in an initial stage of electron impact ionization (EI) it is predominantly primary ions of the reactant gas which are formed. The EI ions of the analysis gas which are created at the same time are relatively small in number but they subsequently form background noise in the final CI spectrum of the analysis gas ions.

In ion traps which are operated at pressures of $10^{-4}$ to $10^{-3}$ millibar such a high ratio of concentrations of reaction gas and analysis gas cannot be set because if it were, the reaction times would be too long due to the pressures being much lower. For this reason, in ion traps there are far more fragmented ions resulting from EI ionization if no further protective measures are taken.

The primary ions of the reactant gas which are formed in the phase of electron impact ionization are naturally not uniform but, in turn, consist of the molecular and fragmented ions of the reactant gas, in which one type of ion (ions of a single mass) usually largely predominates. For convenience, this predominant type of primary ion is referred to herein as the "main primary ion". The main primary ions are generally not suitable for subsequent chemical ionization for energy and structural reasons. The main primary ions of the reactant gas, however, then react in a second stage with molecules of the reactant gas in ion-molecule reactions, "main secondary ions" of the reactant gas being formed. The main secondary ions have a structure and an energy balance which allow them to react with the molecules of the analyte gas in a third stage, forming the CI analyte gas ions.

The structure necessary for chemical ionization is generally characterized in that a proton is relatively loosely bound to a residual molecule which otherwise has a very stabile energy balance. Chemical ionization is largely a protonation reaction. In rarer cases it is a methylation reaction or the transfer of an even larger charged fragment. In general the aim is to achieve undisturbed protonation.

Example: during chemical ionization with water as reactant gas the primary ions $H_2O^{+\cdot}$ are initially formed. Also created are the subprimary ions $OH^+$, of which there is a large number, but they have no further involvement here. The primary ions $H_2O^{+\cdot}$ react with other water molecules according to the equation $$H_2O+H_2O^{+\cdot}=OH^{\cdot}+OH_3^+ \quad (1)$$

forming the free radical $OH^{\cdot}$ and the main secondary ion $OH_3^+$. The main secondary ion $OH_3^+$ then reacts with molecule M of the test substance in accordance with the equation $$OH_3^+ + M = H_2O + MH^+ \quad (2)$$

forming the "pseudomolecular ion" $MH^+$. This protonation reaction (2) is the "chemical ionization" proper.

Naturally with all these processes there are a number of side reactions which may lead to other CI analysis gas ions. The side reactions can be caused by subprimary ions but they are chiefly generated by side reactions of the main primary ions which then lead to subsecondary ions. The subsecondary ions can then, with their own CI reactions, lead to slightly different CI analysis gas ions.

Apart from the protonating CI reaction, which is really desired, there are other ionization reactions of the main secondary ion taking place for this reason, which, under certain circumstances, may lead to large quantities of fragmented ions of the test molecule. It depends on the aim of the investigation as to whether these are desirable or undesirable. For energy reasons the fragmented ions are generally all the more frequent, the smaller the ionizing main secondary ions are.

Sometimes there are even two competing CI reactions of the same reactant gas, whereby the formation of fragmented ions is different for the two reaction chains. Example: The frequently used chemical ionization with methane as reactant gas initially leads to the EI ions $CH_3^+$ and $CH_4^{+\cdot}$, the relative frequency of which depends on the energy of the ionizing electrons. These electrons react with other methane molecules forming two different main secondary ions.

$$CH_3^+ + CH_4 = H_2 + C_2H_5^+ \quad (3)$$

$$CH_4^+ + CH_4 = CH_3^{\cdot} + CH_5^+ \quad (4)$$

Under normal conditions at a pressure of 0.7 millibar about 48% ions are type $CH_5^+$ and 40% type $C_2H_5^+$, the remainder being accounted for by even heavier ions. The main reactions for the subsequent chemical ionization are:

$$C_2H_5^+ + M = C_4H_4 + MH^+ \quad (5)$$

$$CH_5^+ + M = CH_4 + MH^+ \quad (6)$$

whereby the second reaction (6) provides more subsequent fragmentations than the first one.

As is evident from this, chemical ionization can be adapted to the problem of the investigation. Consequently, chemical ionization is generally always "softer" whenever one proceeds to heavier reactant gas ions or selects the correspondingly heavier main secondary ions. If chemical ionization with water ($OH_3^+$ as main secondary ion) is still relatively hard, it is increasingly softer in the sequence ammonia ($NH_4^+$), methane ($CH_5^+$, $C_2H_5^+$), isobutane ($C_4H_9^+$ and many others).

For chemical ionization in an ion trap a mixture is usually admitted made up of a collision gas of low molecular weight, a reactant gas for forming the output ions for chemical ionization, and an analyte gas to be tested. In ion traps, however, no such high concentration ratio can be set as is permitted by the ion sources usually operated at a pressure of 1 millibar for other types of mass spectrometer. For this reason, in ion traps it is particularly disadvantageous that the fragmented ions of the test substance cannot be removed from electron impact ionization and remain visible in the CI spectrum of the substance.

To eliminate this disadvantage, EP 0 215 615 B1 describes a method whereby initially only light ions in a certain mass range are stored. The range of light ions covers both the primary and secondary reactant gas ions as well as the light fragmented ions which result from the analysis gas molecules by electron impact. In a second stage in which the storage conditions of the ion trap are changed, storage of the CI ions of the analysis substance are then admitted. The CI ions are then identified by the special method of ion ejection by mass-sequential stability at the limit of the stability range in the a,q diagram, including the remaining electron impact ions.

Consequently, the disadvantage of chemical ionization in ion traps compared with standard CI ion sources is partially offset. There is still the deficiency that the remainders of electron impact ionization are not eliminated and also that there is no clear selection of reaction paths.

Due to the publication "A New Mode of Operation for the Three-Dimensional Quadrupole Ion Store (Quistor): The Selective Ion Reactor" by J. E. Fulford and R. E. March (International Journal of Mass Spectrometry and Ion Physics 26 (1978) 155) a method is known where during electron impact ionization the main primary ions in the ion trap are freed of all other ions because the working point of the main primary ions with a pulse of DC voltage is briefly shifted into the corner of the stability diagram. Consequently all the other ions are transferred to instable areas and thus removed from the ion trap. After the end of the pulse the reactions required can then take place with the analysis gas molecules. The resulting product ions are then expelled from the ion trap by a pulse. They pass through a quadrupole filter with which in any experiment one type of ion can be identified. By cyclic repetition of the experiment with different filter values for the quadrupole filter the entire spectrum can be scanned.

The disadvantage of this method is that only the main primary ions of single-stage CI processes can be isolated. The single-stage CI processes in this work are generally based on the so-called charge exchange (CE) reactions but these are much less interesting and are not even classified as CI processes by some authors. Moreover, this method can only provide relatively few of the desired reactant gas ions for physical reasons (depth of potential wall). Even in the event of a combination with one of the modern standard methods of scanning which identify all the ions in the ion trap by mass-sequential ejection, there is still the disadvantage of not being able to eliminate side reactions of the main primary ions.

The present invention seeks to provide a method which permits tailored chemical ionization of the molecules of the test substance by secondary reactant gas ions without the formed CI ions of the test substance being contaminated with fragmented ions from electron impact ionization or with product ions from side reactions. In the same way it should be possible to provide suitable output ions for ion-molecule reactions.

From U.S. Pat. No. 4,761,545, EP 0 362 432 A1, and U.S. Pat. No. 5,134,286 it is known that an ion trap can be subjected to a frequency mixture in such a way that storage of ions with selected mass-to-charge ratios is prevented. The frequency mixture is applied as a mixture of voltages with various frequencies to the electrodes of the ion trap and inside the ion trap generates corresponding alternating fields which can cause the secular oscillations of the ions in the ion trap to perform resonant energy absorption dependent on mass.

If the frequency mixture is applied to the two end caps of the ion trap in phase opposition, a dipolar alternating field is created in the ion trap with excitation of the oscillations in the axial direction of the ion trap. If the frequency mixture is applied to the two end caps in phase, hence phase opposition between the ring electrode on the one hand and the end cap electrodes on the other, a quadrupolar alternating field is generated in the ion trap which can excite the secular oscillation both in the axial and in the radial direction.

In particular it is possible to generate the frequency mixture in such a way that due to integrated frequency gaps only a few types of ion with selected mass-to-charge ratios can be stored. Furthermore it is possible to adapt the frequency mixture during a phase of electron impact ionization so that only certain ions of the resulting ion mixture are stored.

Therefore, it is an object of the invention to select product ions of the desired two first stages of the reaction path in such a way that they are stored on their own and to suppress the product ions of undesirable reaction paths.

SUMMARY OF THE INVENTION

The invention resides in a method for carrying out ion-molecule reactions in RF quadrupole ion traps. By superposing the quadrupole field with a dipolar frequency mixture in which there are two accurately selected frequency gaps, only storage of the desired primary and secondary ions of the reactant gas is permitted in the first phase of electron impact ionization of the mixture of analyte and reactant gases. All the other ions are prevented from being stored by excitation of their secular oscillations. In the second ionization phase, in which all the ions in a wide range of mass-to-charge ratios can be stored by switching off the dipolar frequency mixture, it is the secondary ions which ensure chemical ionization of the analysis gas molecules.

This new type of chemical ionization permits the selection of the product ions of a single desired CI reaction and suppresses all the undesirable side-reactions with other ions of the gas mixture introduced.

By analogy, the method can also be used for reaction paths which have more than three stages or which use ions made externally. There are further potential applications in the field of customized ion-molecule reactions as probes for certain characteristics of analyte gas molecules, to clarify molecular structure for example.

In accordance with the invention, there is provided a method of carrying out an ion-molecule reaction on molecules of a sample gas in an RF quadrupole ion trap, which method comprises the steps of (a) carrying out an ionisation reaction to form primary ions, the primary ions being such as to initiate a desired reaction path to the ion-molecule reaction, the reaction path involving at least one secondary ion; (b) operating the ion trap so as to store only ions lying on the desired reaction path, including at least the primary and secondary ions, and optionally containing other ions, for example tertiary ions; (c) causing ions stored in the ion trap, (for example the secondary or tertiary ions) to take part in the ion-molecule reaction with the sample gas, and varying the operation of the ion trap so as to permit storage in the ion trap of the products of the ion-molecule reaction; and (d) measuring the product ions by using the ion trap as a mass spectrometer.

In a preferred aspect of the invention, a frequency mixture is applied during electron impact ionization of a gas mixture so that only the ions which are generated to form desired secondary (or even tertiary) reactant gas ions along a selected reaction path, are stored in the ion trap. Then, by switching the frequency mixture off, storage of all the ions in a mass range of interest is enabled, and the CI ions from the reaction of the secondary (or tertiary) reactant gas ions with the molecules of the test substance can be stored. In an intermediate phase, after switching off the electron impact ionization, alternatively, the remaining primary reactant gas ions can be eliminated by a different frequency mixture if they are not wanted in the phase of chemical ionization proper.

This type of chemical ionization by reactant gas ions of a selected reaction path leads to very clear-cut CI spectra.

Since the formation of the reactant gas ions can be continued over any length of time, the ion trap can be filled with these ions up to the space charge limit. When the space charge limit has been reached, the secular frequencies of the ions stored may be shifted so here too the space charge limit constitutes a limit for filling the ion trap. However, since these ions quantitatively transform into CI ions of the test substance as the method continues, an ideal high yield of CI ions can result.

BRIEF DESCRIPTION OF THE DRAWINGS

A number of preferred embodiments of the invention will now be explained in more detail with reference to the accompanying drawings, in which:

FIG. 3 shows a time diagram for the sequence of a complete measuring cycle.

DETAILED DESCRIPTION OF THE ILUSTRATIVE EMBODIMENTS

Figure 1:
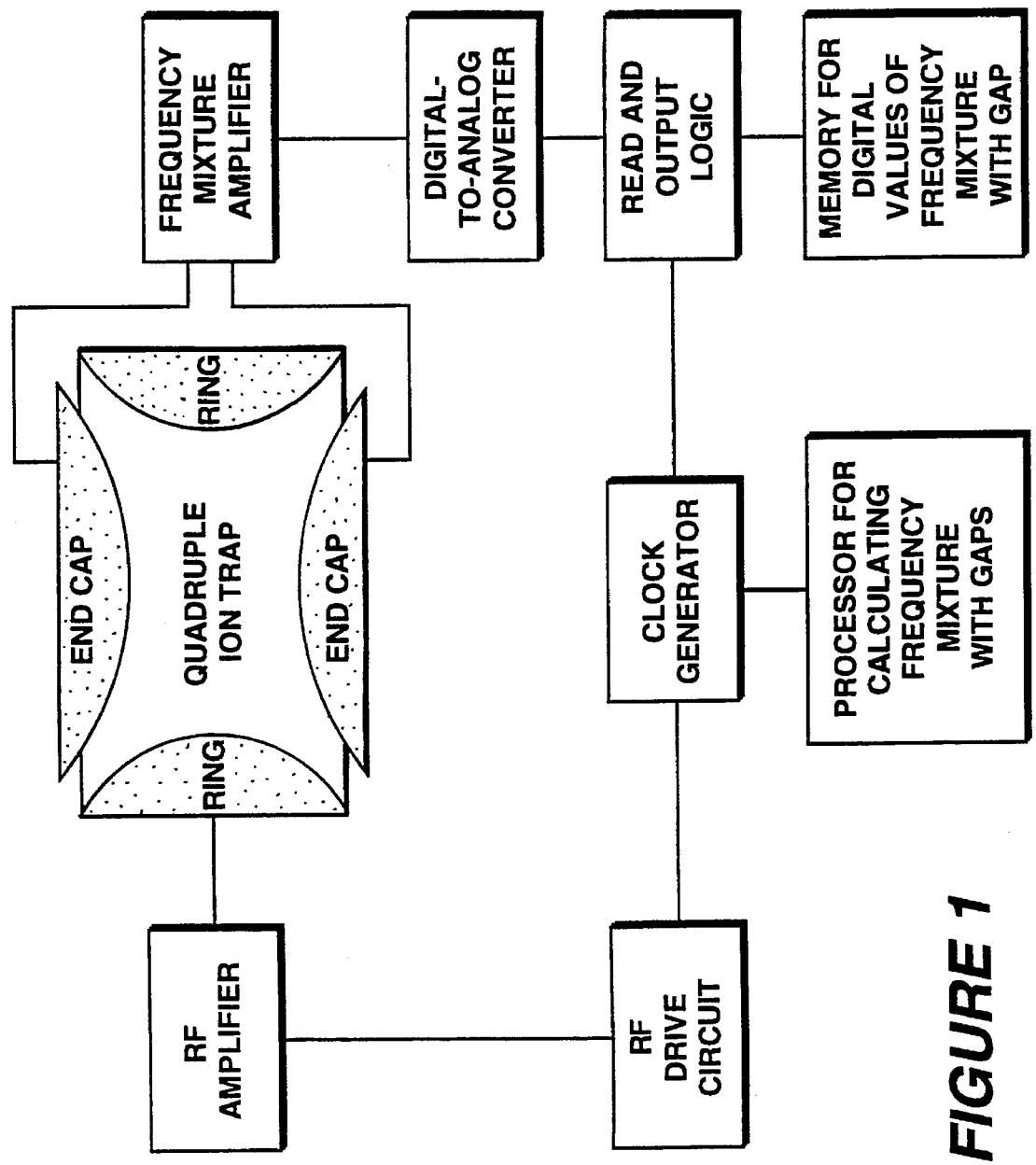
FIG. 1 shows a block diagram of a high frequency quadrupole ion trap.

FIG. 1 shows a block diagram of an arrangement including a high frequency quadrupole ion trap, which can prevent storage of ions in a wide range of masses, but permits storage of some selectable types of ion. A processor can calculate the digital values of a superposed quasihomogenous frequency mixture with a few integrated frequency gaps step by step. These values are stored in a digital memory. During certain ion trap operating statuses these values can be read out under clock control and fed to an analog amplifier via a digital-to-analog converter. The voltage mixture generated can be applied across the two end caps of the ion trap to create a dipolar field. Inside the ion trap a dipolar field is then generated with the frequencies of the voltage mixture which excites the secular oscillations of the stored ions. All the ions which undergo resonance of their secular oscillation with one of the frequencies in the mixture are in this way enlarged with respect to oscillation amplitude until they leave the quadrupole field by impact on to the electrodes or by ejection. Only those ions whose secular frequency coincides with the frequencies of the gaps in the z-direction can be stored. These ions are usually decelerated in a collision gas until they collect at the center of the ion trap. Storage of the ions is brought about by a quadrupolar radio frequency field which, under clock generator control, is supplied by an RF amplifier via an RF drive circuit. The voltage of the RF amplifier is usually applied to the ring electrode.

Figure 2:
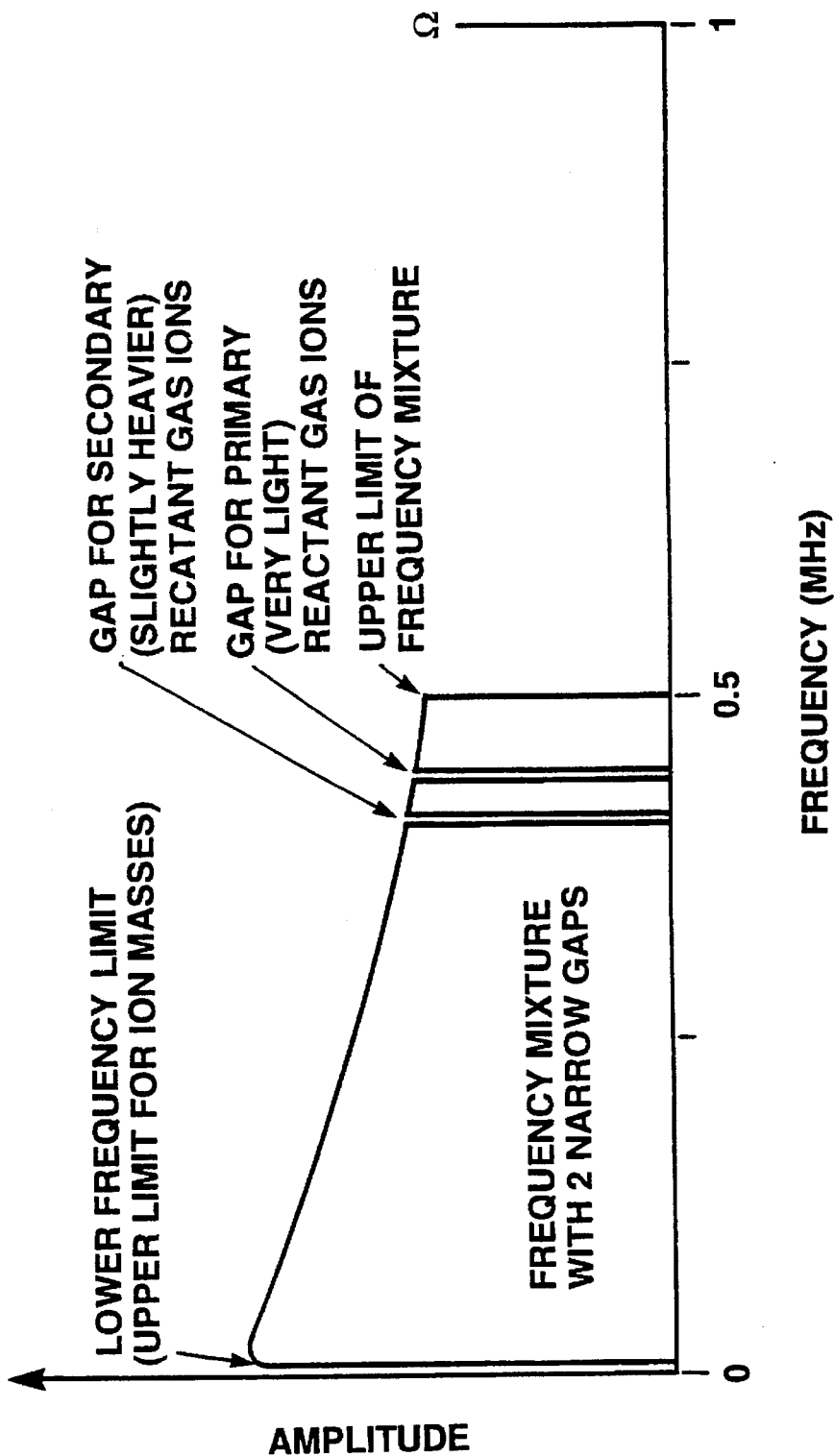
FIG. 2 shows an amplitude profile of a frequency mixture with two integrated gaps.

FIG. 2 shows an amplitude profile of a frequency mixture with two integrated gaps. Such a frequency mixture can, for example, be generated as white noise, from which two narrow frequency ranges are eliminated by filtering. However, digital generation is simpler, as shown in FIG. 1. The frequency mixture illustrated here as continuous is then generated from individual frequencies which are close together though. The density of the frequencies must be adequate so that all the adjacent ion masses are included. Such a frequency mixture is termed "quasi homogenous".

The frequency mixture must have an upper limit or else the side band frequencies of the secular oscillation of the desired ion types to be stored will be included and these ions will also be eliminated. The upper limit should in theory be $\Omega/2$, whereby $\Omega$ is the frequency of the drive or storage radio frequency. In FIG. 2 this limit is shown for the frequency mixture. The limit corresponds to storage of the so-called cut-off mass, below which no more ion masses can be stored in the ion trap.

FIG. 3 shows a time diagram for the sequence of a complete measuring cycle with a period for ionization (here due to the impact given by electrons which are shot into the ion trap in the form of an electron beam from outside), with a period of selective storage of ions of the reaction path, with a subsequent period for chemical ionization, and a final period for scanning the spectrum of the chemically ionized analysis gas molecules.

The period of selective storage is characterized by the application of the frequency mixture with selected gaps. It covers the period of electron impact ionization and continues after the electron impact ionization has been switched off in order to wait for transformation of the primary ions of the reactant gas to secondary ions. Due to the high concentration of reactant gas this transformation normally takes place very quickly. Naturally, in this period ion-molecule reactions with the analysis gas also take place already. However, the product ions of these reactions cannot be stored. Due to the lower concentration of analysis gas the product ion of the output ions for the reactions by far offsets the losses of output ions.

The period of selective storage ends when the frequency mixture is switched off. The frequency mixture is best switched off when no further increase in output ions for the further ion-molecule reactions is to be expected. From that time on, the product ions of the required CI reaction can be stored. The output ions for this CI reaction are consumed almost completely if the CI period is of adequate length. The ensuing period of spectrum scan shows only a few of the output ions for the reaction.

The CI spectra of the analyte substances obtained in this way are exceptionally clear-cut. They contain no fragmented ions of the electron impact ionization whatsoever and also no ions which have resulted from side reactions.

The reactant ions for the ion-molecular reactions do not have to be generated within the ion trap. They can also be generated outside the ion trap and shot into the trap at low energy. Again they may be primary reactant gas ions from which the secondary reactant ions are formed in the ion trap, or the secondary ions can already be introduced into the trap. In both cases, within the meaning of the invention, there is mass-selective storage of ions which are of interest along the reaction path to the output ions.

If the remaining primary reactant gas ions disturb subsequent ion-molecule reactions, they can be eliminated by changing the frequency mixture for mass-selective storage just before the phase of ion-molecule reactions.

Analysis of the product ions of the ion-molecule reaction or the CI reaction can take place with the ion trap itself which is used as a mass spectrometer in this case. On the one hand, any of the various familiar methods of mass-selective ion ejection can be used but on the other, methods may also be used to analyze the secular frequencies inside the ion trap without ion ejection.

For mass-selective ion ejection the following methods have become known: (a) the "mass-selective instability scan" (U.S. Pat. No. 4,548,884), (b) mass-selective ejection by nonlinear resonances (U.S. Pat. No. 4,975,577), and (c) ejection by electrically generated dipole or quadrupole fields (U.S. Pat. No. 4,882,484, U.S. Pat. No. Re 34,000). All three methods advantageously use a linear increase in the storage RF voltage for mass-sequential ion ejection, as illustrated in FIG. 3.

For the analysis of the secular frequencies Fourier transformation methods have become known which were applied to induced image currents in special electrodes, but also to the frequency of laser-induced fluorescent flashes. These too can be used to scan the mass spectrum.

The foregoing description has been limited to specific embodiments of this invention. It will be apparent, however, that variations and modification may be made to the invention, with the attainment of some or all of its advantages. Therefore, it is the object of the appended claims to cover all such variations and modifications as come within the true spirit and scope of the invention.

What is claimed is:

1. A method for carrying out an ion-molecule reaction on molecules of a sample gas in an RF quadrupole ion trap, said method comprising the steps of:

(a) carrying out an ionization reaction to form primary ions, said primary ions being such as to initiate a desired reaction path to said ion-molecule reaction, said reaction path involving at least one secondary ion;

(b) operating the ion trap so as to store only ions lying on said desired reaction path, including at least said primary and secondary ions said operating of the trap including operating the trap to eject ions from the trap which have mass-to-charge ratios between the mass-to-charge ratio of the primary ions and the mass-to-charge ratio of the secondary ions;

(c) causing ions stored in the ion trap to take part in said ion-molecule reaction with the sample gas, and varying the operation of the ion trap so as to permit storage in the ion trap of products of said ion-molecule reaction; and (d) measuring said product ions by using the ion trap as a mass spectrometer.

2. The method of claim 1 wherein said step of operating the ion trap to store only said ions lying on said desired reaction path comprises the step of applying to the ion trap a dipolar or quadrupolar frequency mixture with gaps, such that the gaps in the frequency mixture permit storage of the ions required.

3. The method of claim 2, wherein the frequency mixture with gaps is generated in a digital manner.

4. The method of claim 1 further comprising the steps of:
   (e) generating reactant ions for said ion-molecule reactions outside the ion trap;
   (f) introducing said reactant ions into the trap by ion-optical means; and
   (g) storing said reactant ions in the trap mass-selectively.

5. The method of claim 1, wherein the ion trap contains not only molecules of the analysis gas but also molecules of the reactant gas for forming the desired reactant ions for said ion-molecule reactions, and wherein said reactant ions for the reactions inside the ion trap are formed by electron impact ionization of the reactant gas, forming primary reactant gas ions, and by reaction of the primary reactant gas ions with other reactant gas molecules, forming secondary reactant gas ions.

6. The method of claim 1 further comprising, before step (c), the step of eliminating predecessor ions of the ions which take part in said ion-molecule reaction from the ion trap by changing the frequency mixture for mass-selective storage.

7. The method of claim 1 wherein the ion-molecule reactions are reactions for chemically ionizing the analyte molecules.

8. The method of claim 1 further comprising the step of carrying out mass-spectrometric analysis of said product ions using mass-selective ion ejection.

9. The method of claim 8 wherein the mass-selective ejection is a mass-sequential instability scan.

10. The method of claim 9 wherein the mass-selective ejection is ejection by nonlinear resonances which is supported by an electrically generated dipole resonance.

11. The method of claim 8 wherein the mass-selective ejection is ejection by an electrically generated dipole or quadrupole resonance.

12. The method of claim 1 further comprising the step of carrying out mass-spectrometric analysis of said product ions by a method including frequency analysis of the secular oscillations of the stored ions.

13. The method of claim 12 wherein the step of carrying out further comprises the step of carrying out the frequency analysis of the secular oscillations using Fourier analysis.

14. A method for carrying out an ion-molecule reaction on molecules of a sample gas in an RF quadrupole ion trap, said method comprising the steps of:
   (a) carrying out an ionization reaction to form primary ions, said primary ions being such as to initiate a desired reaction path to said ion-molecule reaction, said reaction path involving at least one secondary ion;
   (b) applying an RF quadrupole storage field to the ion trap, said quadrupole storage field being capable of storing ions in a relatively wide range of mass-to-charge ratios;
   (c) applying a dipolar excitation field to the ion trap, the dipolar field having frequency gaps which encompass the secular oscillation frequencies of ions lying on said desired reaction path, including at least said primary and secondary ions, the dipolar excitation field causing ejection from the ion trap of ions with secular oscillation frequencies not encompassed by said frequency gaps;
   (d) causing ions stored in the ion trap to take part in said ion-molecule reaction with the sample gas, and varying the operation of the ion trap so as to permit storage in the ion trap of products of said ion-molecule reaction;
   (e) measuring said product ions by using the ion trap as a mass spectrometer.

* * * * *